United States Patent
Mukai et al.

(10) Patent No.: US 9,068,673 B2
(45) Date of Patent: Jun. 30, 2015

(54) SUMP WALL PENETRATION FITTING

(71) Applicant: S. Bravo Systems, Inc., Commerce, CA (US)

(72) Inventors: Don K. Mukai, Pasadena, CA (US); Micah J. Nelson, Yuba City, CA (US); Juan S. Albino, Baldwin Park, CA (US)

(73) Assignee: S. Bravo Systems, Inc., Commerce, CA (US)

( * ) Notice: Subject to any disclaimer, the term of this patent is extended or adjusted under 35 U.S.C. 154(b) by 151 days.

(21) Appl. No.: 13/773,163

(22) Filed: Feb. 21, 2013

(65) Prior Publication Data

US 2014/0232106 A1 Aug. 21, 2014

(51) Int. Cl.
*F16L 41/00* (2006.01)
*F16L 5/02* (2006.01)
*F16L 5/14* (2006.01)

(52) U.S. Cl.
CPC .... *F16L 5/02* (2013.01); *F16L 5/14* (2013.01)

(58) Field of Classification Search
CPC .................. F16L 5/02; F16L 5/10; F16L 5/12
USPC ................ 285/139.1, 139.2, 139.3, 205, 206, 285/142.1, 213, 215, 141.1
See application file for complete search history.

(56) References Cited

U.S. PATENT DOCUMENTS

| 735,377 | A | * | 8/1903 | Hochheimer | 285/206 |
| 803,687 | A | * | 11/1905 | Grotewohl | 285/205 |
| 858,899 | A | * | 7/1907 | McNutt | 285/206 |
| 1,015,180 | A | | 1/1912 | Heitman | |
| 1,364,313 | A | * | 1/1921 | Rice | 285/139.1 |
| 1,473,300 | A | | 11/1923 | Kruger et al. | |
| 2,464,332 | A | | 3/1949 | Maund et al. | |
| 2,953,618 | A | | 9/1960 | Buono et al. | |
| 2,985,291 | A | | 5/1961 | Schoepe et al. | |
| 3,104,120 | A | | 9/1963 | Myers | |
| 3,206,232 | A | * | 9/1965 | Varhanik et al. | 285/139.2 |
| 3,435,128 | A | | 3/1969 | Dorwald | |
| 3,998,515 | A | | 12/1976 | Panek | |
| 4,211,423 | A | | 7/1980 | Resech | |
| 4,480,860 | A | | 11/1984 | Foresta et al. | |
| 4,482,163 | A | | 11/1984 | Depweg | |
| 4,932,257 | A | | 6/1990 | Webb | |

(Continued)

FOREIGN PATENT DOCUMENTS

DE 835239 3/1952
FR 720741 12/1931

(Continued)

*Primary Examiner* — David E Bochna
(74) *Attorney, Agent, or Firm* — Christie, Parker & Hale, LLP

(57) ABSTRACT

A penetration fitting includes a first fitting half having an inner surface and an outer surface opposite the inner surface, the first fitting half defining an arcuate channel, and a second fitting half having an inner surface and an outer surface opposite the inner surface, the second fitting half defining an arcuate channel, wherein the first and second fitting halves are adapted to abut one another with the inner surfaces of the first and second fitting halves together defining an inner end, the outer surfaces of the first and second fitting halves defining an outer end, and the arcuate channels of the first and second fitting halves cooperating to define a tapered opening configured to accept the at least one pipe segment, the opening having a larger diameter at the inner end and a smaller diameter at the outer end.

26 Claims, 11 Drawing Sheets

(56) References Cited

U.S. PATENT DOCUMENTS

| | | |
|---|---|---|
| 4,971,225 A | 11/1990 | Bravo |
| 4,983,784 A | 1/1991 | Whitlock |
| 5,027,665 A | 7/1991 | Hayward |
| 5,051,541 A | 9/1991 | Bawa et al. |
| 5,129,684 A | 7/1992 | Lawrence et al. |
| 5,135,324 A | 8/1992 | Bravo |
| 5,226,681 A | 7/1993 | Smith et al. |
| 5,297,896 A | 3/1994 | Webb |
| 5,341,857 A | 8/1994 | Bravo |
| 5,366,318 A | 11/1994 | Brancher |
| 5,967,567 A * | 10/1999 | Nordstrom ............... 285/139.1 |
| 6,079,751 A * | 6/2000 | Youngs ..................... 285/139.1 |
| 7,527,299 B1 * | 5/2009 | Collier ...................... 285/139.3 |
| 7,640,603 B2 * | 1/2010 | Robertson ................. 285/205 |
| 7,712,791 B1 * | 5/2010 | Whitehead ................ 285/215 |

FOREIGN PATENT DOCUMENTS

| | | |
|---|---|---|
| FR | 1562838 | 4/1969 |
| GB | 339678 | 12/1930 |
| GB | 887164 | 1/1962 |
| SE | 84956 | 11/1935 |

* cited by examiner

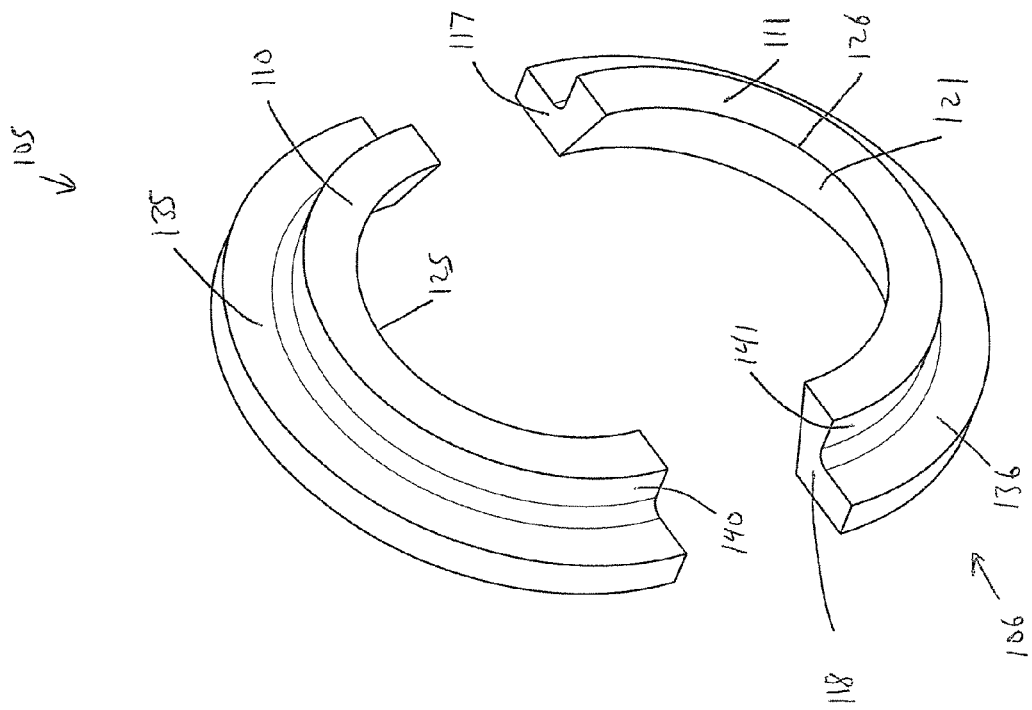
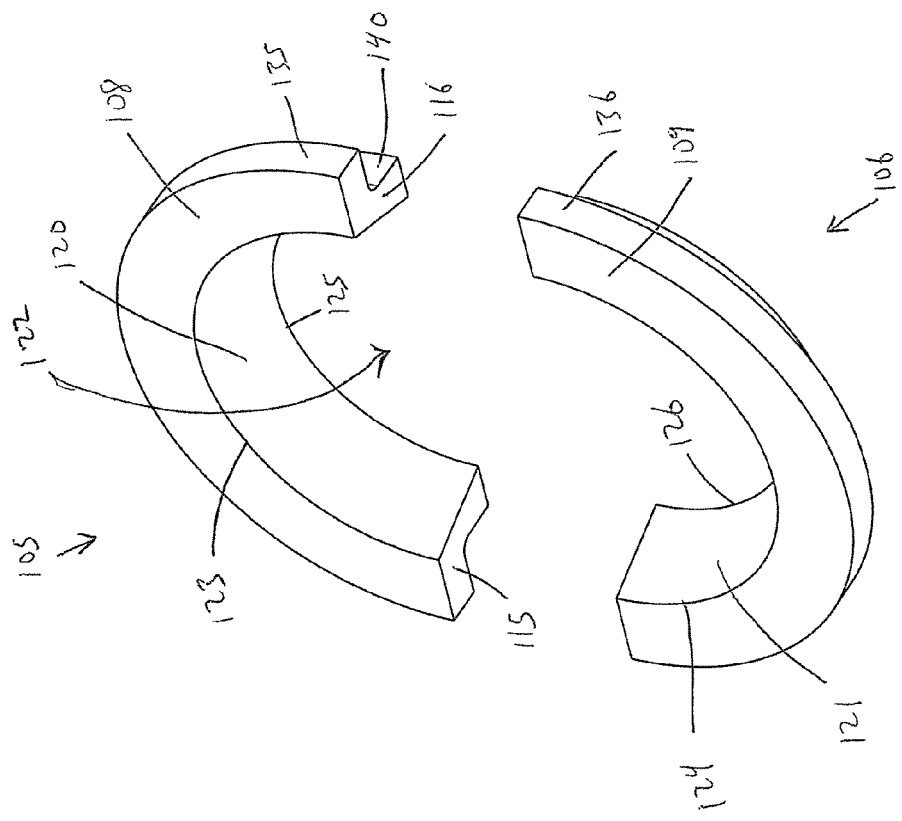
FIG. 2B
FIG. 2A

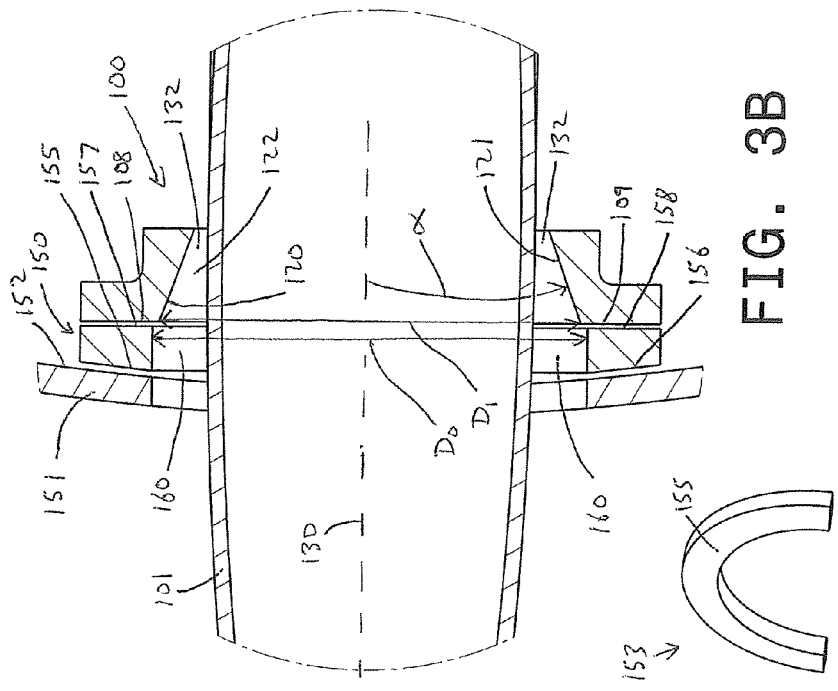
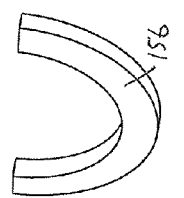
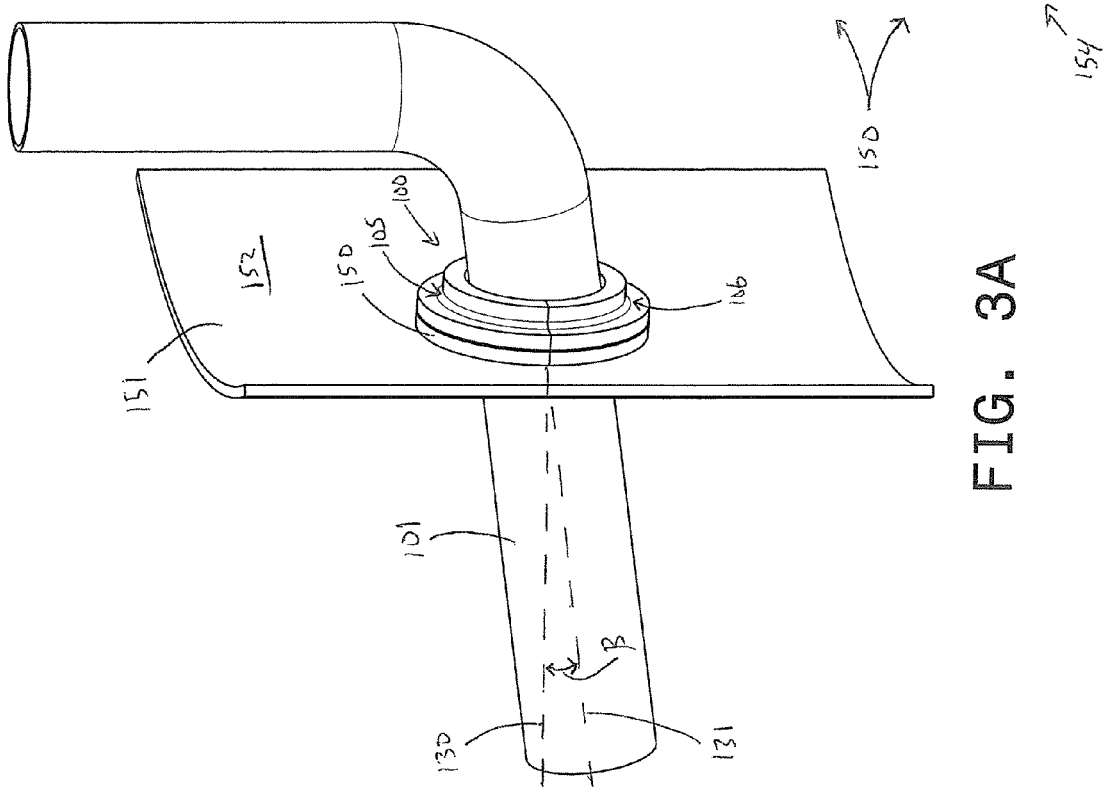
FIG. 3A
FIG. 3B
FIG. 3C

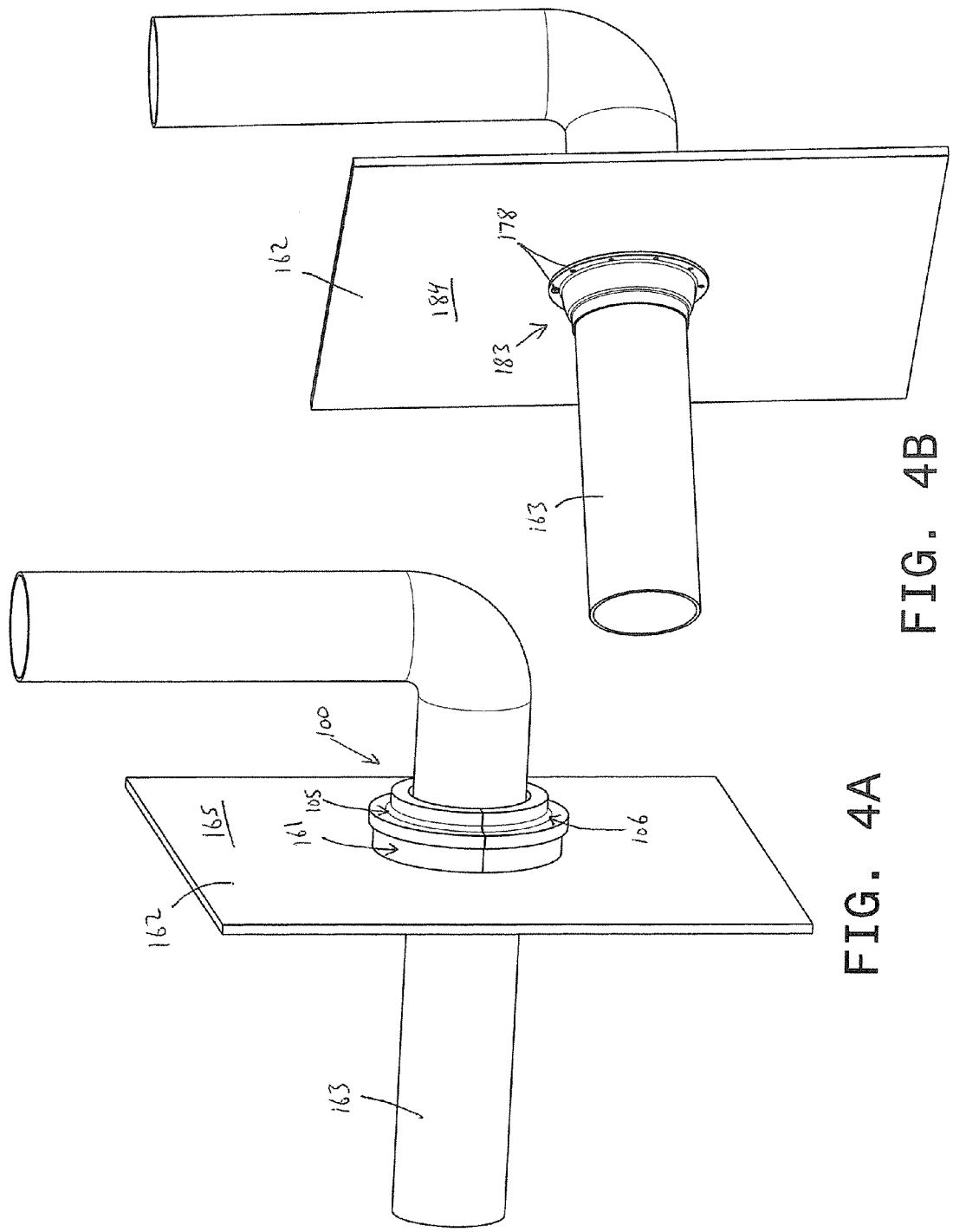

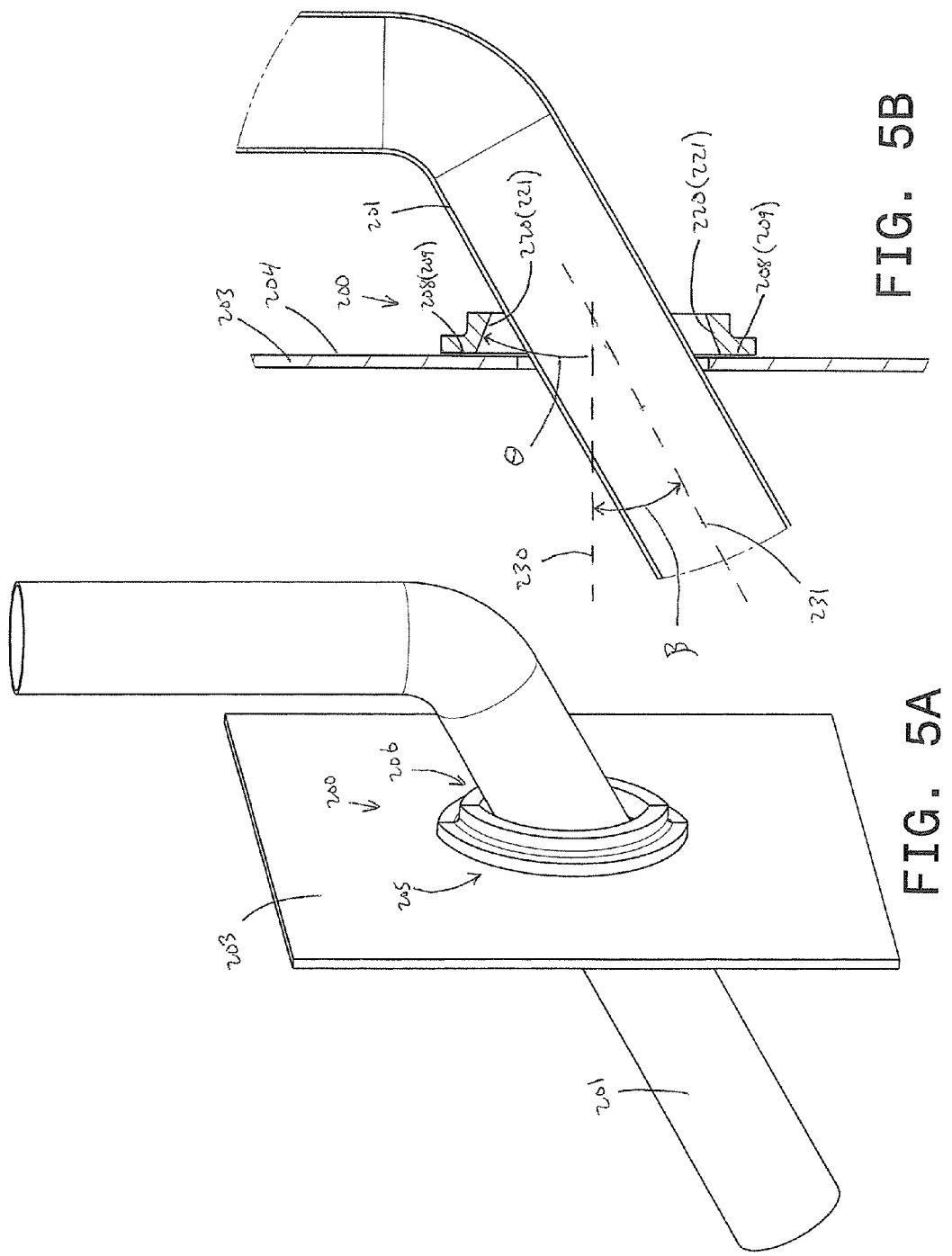

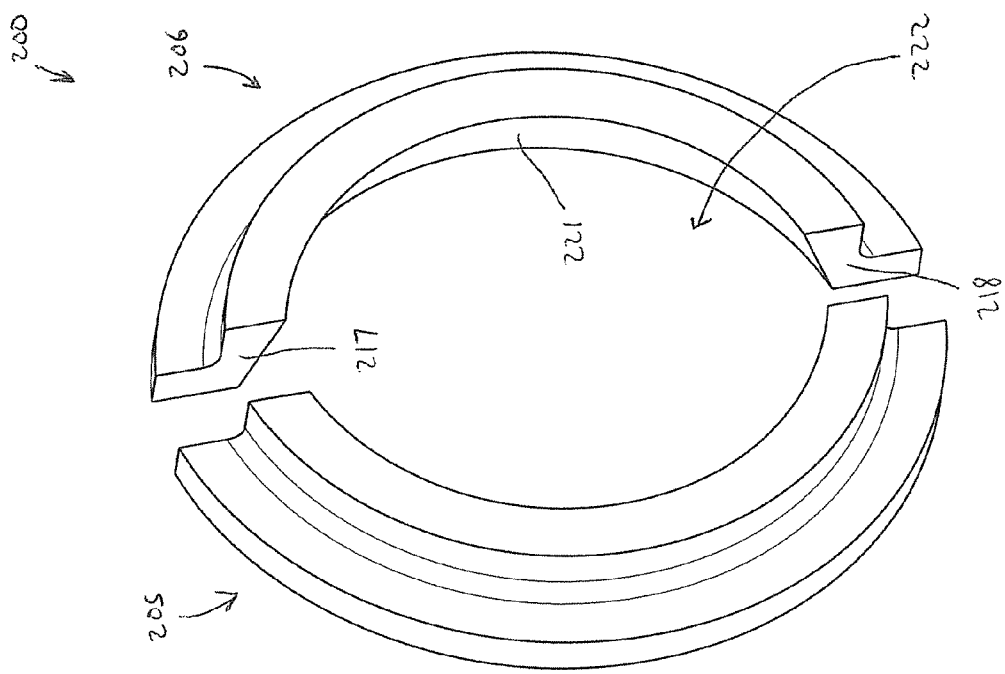
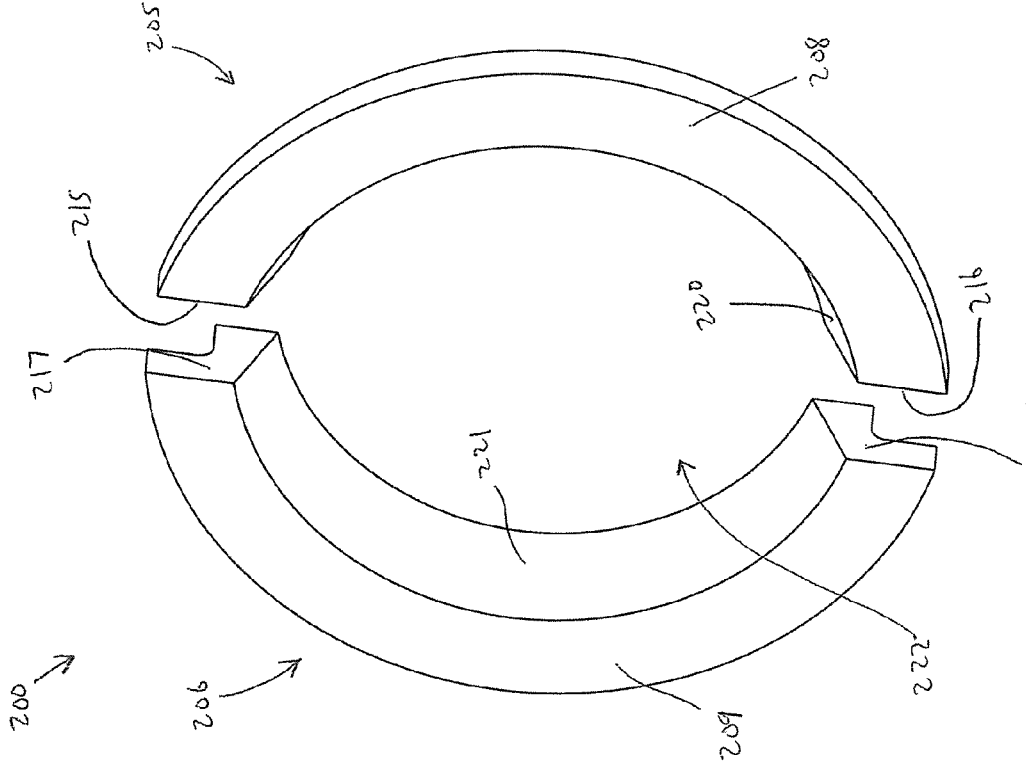

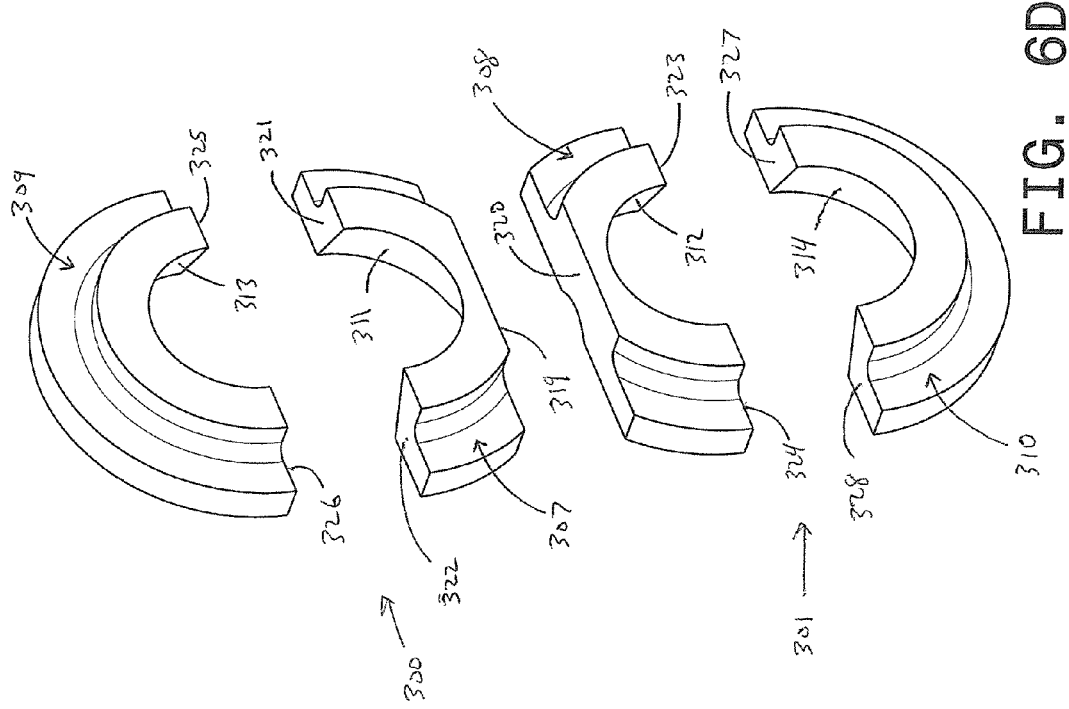
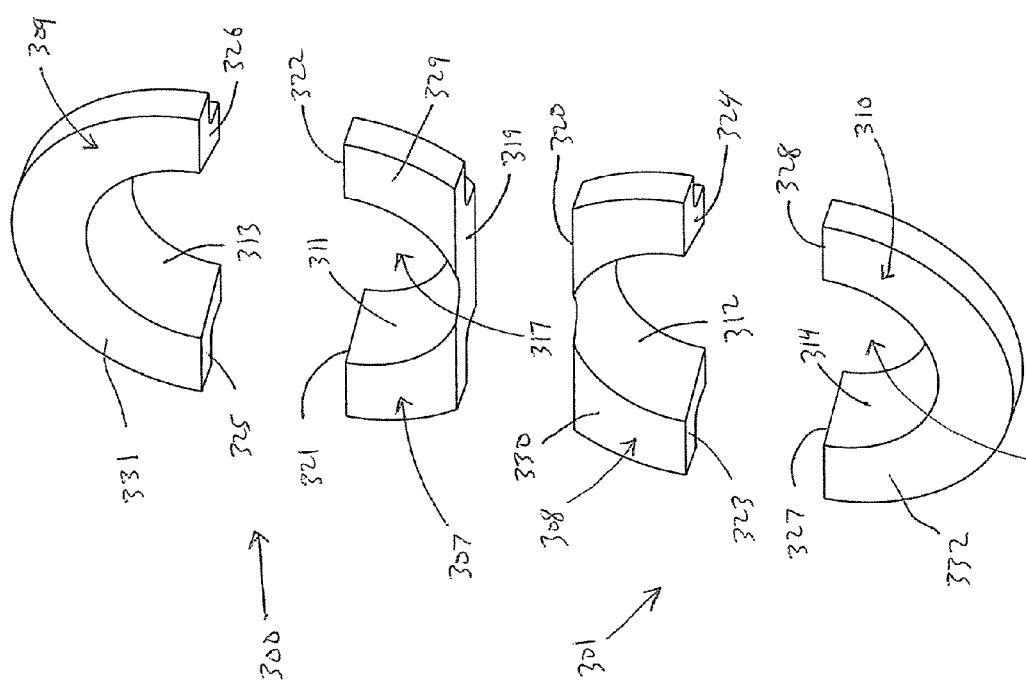

SUMP WALL PENETRATION FITTING

FIELD OF THE INVENTION

The present invention relates generally to penetration fittings, and more particularly to penetration fittings configured to seal one or more pipes penetrating a sump wall.

BACKGROUND

Underground storage tank (UST) fueling sites, such as retail gas stations, include pipelines carrying a product such as gasoline from the storage tank to a product dispenser. Each pipeline typically includes a primary pipeline through which the product flows, and a secondary pipeline that surrounds the primary pipeline. The purpose of the secondary pipeline is to contain any fluid that may leak from a damaged primary pipeline, and prevent the fluid from contaminating the surrounding ground. As used herein, the primary pipeline and the secondary pipeline are referred collectively as the pipeline or the pipe.

A sump is also typically provided beneath the product dispenser to contain any fuel released from failed equipment and thereby prevent environmental contamination (e.g., ground water contamination) under and around the service station. Each of the primary pipelines extends through an aperture in the wall of the sump to a pipe fitting which connects the primary pipeline to the product dispenser. The aperture in the sump wall through which the pipeline penetrates must be sealed to prevent the accumulated fuel in the sump from leaking through the aperture in the sump wall and into the surrounding ground. Accordingly, penetration fittings are provided to form seals between the sumps and the associated pipelines to contain fuel leakage within the sumps.

Conventionally, flexible boots are used to seal between the pipeline and the sump because flexible boots can bend to accommodate pipelines that penetrate the sump wall at an oblique angle. However, conventional flexible boots are made of materials having a relatively low chemical resistance (e.g., rubber or plastic) that degrade quickly and prematurely fail in the harsh sump environment. When these conventional flexible boots fail and begin to leak, they are conventionally replaced with a split repair boot or fitting. However, these split repair boots are also conventionally made from a material having a relatively low chemical resistance (e.g., urethane based plastic) that tends to degrade and fail quickly in the sump environment. Additionally, because flexible boots must bend to accommodate pipes penetrating the sump wall at an oblique angle, the flexible boots are under constant stress which can lead to premature failure.

Other conventional penetration fittings may be made of a more durable material. However, such conventional fittings are generally rigid and must be installed during construction of the UST fueling site and the installation of the sumps. Installing these conventional fittings to retrofit an existing sump installation, rather than during construction of the fueling site, requires excavation of the surround soil, cutting the pipeline, and sliding the penetration fitting over the cut end of the pipeline. Accordingly, retrofitting an existing sump installation with these conventional rigid penetration fittings may be both cost and time prohibitive. Moreover, these rigid conventional fittings cannot accommodate pipes which penetrate the sump wall at an oblique angle.

Additionally, other conventional penetration fitting may use tapered wedges to accommodate pipes penetrating the sump at an oblique angle. However, such tapered wedges increase the overall profile or envelope of the fitting. The increased profile of the fitting may make the fitting unsuitable for use with certain sump and pipe configurations.

SUMMARY

The present invention relates generally to penetration fittings, and more particularly to penetration fittings configured to seal one or more pipes penetrating a sump wall. According to embodiments of the invention, a penetration fitting may be configured to accommodate pipelines penetrating through a sump wall at an oblique angle. The penetration fitting may also be configured to retrofit a failed penetration fitting without having to excavate the site and cut the pipeline. These penetration fittings may also be constructed of a durable material having a relatively high chemical resistance to hydrocarbons.

In one embodiment, the penetration fitting includes a first fitting half having an inner surface and an outer surface opposite the inner surface, the first fitting half defining an arcuate channel, and a second fitting half having an inner surface and an outer surface opposite the inner surface, the second fitting half defining an arcuate channel, wherein the first and second fitting halves are adapted to abut one another with the inner surfaces of the first and second fitting halves together defining an inner end, the outer surfaces of the first and second fitting halves defining an outer end, and the arcuate channels of the first and second fitting halves cooperating to define a tapered opening configured to accept the at least one pipe segment, the opening having a larger diameter at the inner end and a smaller diameter at the outer end with the inner end adapted to be sealed to the sump wall around the aperture. The arcuate channels taper at an angle between approximately 5 degrees and approximately 50 degrees. The opening in the penetration fitting may be generally frusto-conical such that the opening is substantially circular in transverse cross-section. In an alternate embodiment, the opening is generally ellipsoidal in transverse cross-section. Additionally, the inner and outer surfaces of the fitting halves are spaced apart by a distance between approximately 1 inch and approximately 2.5 inches.

The first fitting portion includes a semi-annular first flange formed about a periphery of the wider end of the first arcuate channel, and the second fitting portion includes a semi-annular second flange portion formed about a periphery of the wider end of the second arcuate channel, the first and second semi-annular flanges cooperating to define an annular flange on the inner end of the fitting configured to surround the aperture in the sump wall. Additionally, the first fitting portion includes a semi-annular first lip portion formed about a periphery of the narrower end of the first arcuate channel, and the second fitting portion includes a semi-annular second lip portion formed about a periphery of the narrower end of the second arcuate channel, the first and second semi-annular lip portions cooperating to define an annular lip on the outer end of the fitting. The diameter of the annular flange is larger than the diameter of the annular lip such that an annular shoulder defined between the annular flange and the annular lip. In one embodiment, the penetration fitting may include an annular band configured to surround the annular lip to bias the first and second fitting portions together at the shoulder.

The penetration fitting may include an adapter plate configured to accommodate a sump wall with a curved inner wall surface. In one embodiment, the adapter plate includes an annulus having opposing inner and outer surfaces, and an opening extending between the inner and outer surfaces, wherein the inner surface is curved and the outer surface is substantially flat, and wherein the inner surface is configured to abut the curved inner wall surface of the sump wall, and the outer surface is configured to abut the inner end of the fitting halves, thereby permitting the inner end of the first and second fitting halves to be sealed to the sump wall via the adapter plate. The adapter plate includes a first adapter plate half and a second adapter plate half, the first and second adapter plate halves being attachable together around the at least one pipe.

The penetration fitting may include a hub configured to mechanically secure the penetration fitting to the sump wall and draw the sump wall flush against the hub. In one embodiment, the hub includes a first semi-annular rim, a second semi-annular rim attachable to the first semi-annular rim, the first and second semi-annular rims cooperating to define an opening, and a plurality of apertures disposed circumferentially around the rims, the plurality of apertures configured to receive a plurality of fasteners securing the hub to the sump wall, wherein the hub includes opposing inner and outer surfaces, the inner surface configured to abut an inner wall surface of the sump wall, and the outer surface configured to abut the inner end of the fitting halves, thereby permitting the inner end of the first and second fitting halves to be sealed to the sump wall via the hub. The first semi-annular rim further includes a first semi-annular standoff extending around a periphery of the first semi-annular rim, and the second semi-annular rim further includes a second semi-annular standoff extending around a periphery of the second semi-annular rim. Additionally, the first and second semi-annular rims each include at least one narrow ridge projecting from the inner surface and adapted to dig into the inner wall surface of the sump wall.

The penetration fitting may also include adhesive between the at least one pipe segment and the arcuate channels of the first and second fitting halves, and an adhesive layer disposed between an inner wall surface of the sump wall and the inner end of the fitting halves. The penetration fitting may also include an adhesive layer disposed between the outer surface of the adapter plate and the inner end of the fitting halves. The penetration fitting may include an adhesive bead extending along a joint between the semi-annular standoffs and the inner end of the fitting halves. The adhesive includes fiberglass and has a viscosity between approximately 2,000 centipoise (cps) and 10,000,000 cps. The penetration fitting halves are generally rigid and may include fiberglass reinforced plastic (FRP).

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

Embodiments of a sump wall penetration fitting according to the present invention are described with reference to the following figures. The same reference numerals are used throughout the figures to reference like features and components.

FIGS. 2A and 2B are front and rear exploded perspective views, respectively, of the penetration fitting of FIG. 1A;

FIGS. 3A and 3B are a rear perspective view and an enlarged partial cross-sectional view, respectively, of an adapter plate according to an embodiment of the present invention disposed between a curved sump wall and the penetration fitting of FIG. 1A;

FIG. 3C is an exploded front perspective view of the adapter plate of FIGS. 3A and 3B;

FIG. 4A is a rear perspective view of a hub according to an embodiment of the present invention disposed between the sump wall and the penetration fitting of FIG. 1A;

FIG. 4B is a front perspective view of an existing boot forming a seal around the pipe penetrating the sump wall;

FIGS. 5A and 5B are a rear perspective view and a partial cross-sectional view, respectively, of another penetration fitting according to an embodiment of the present invention forming a seal around a pipe penetrating a sump wall at an extreme oblique angle;

FIGS. 5C and 5D are front and rear exploded perspective views, respectively, of the penetration fitting of FIGS. 5A and 5B;

FIGS. 6C and 6D are exploded front and rear perspective views, respectively, of the penetration fitting of FIGS. 6A and 6B.

DETAILED DESCRIPTION

Figure 1A:
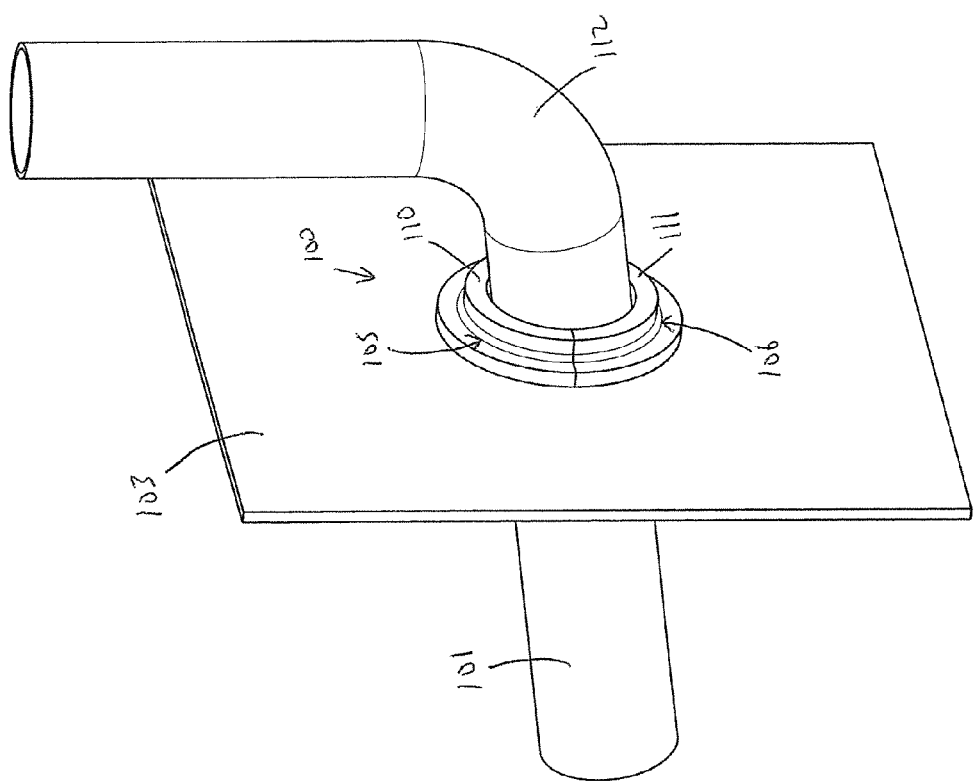
FIGS. 1A and 1B are a rear perspective view and an enlarged partial cross-sectional view, respectively, of a penetration fitting according to an embodiment of the present invention forming a seal around a pipe penetrating a sump wall at an oblique angle.

The present invention is directed to a penetration fitting configured to create a fluid-tight seal around one or more pipes penetrating a sump wall. The penetration fitting of the present invention is a split-type fitting configured to retrofit existing sump installations without having to excavate the soil around the sump or cut the pipe. The penetration fitting is also configured to accommodate one or more pipes penetrating the sump wall at an oblique angle. Additionally, the penetration fitting is a rigid fitting having a high chemical resistivity to hydrocarbons.

In an embodiment of the present invention illustrated in FIGS. 1A, 1B, 2A, and 2B, a penetration fitting 100 is shown surrounding a pipe 101 (e.g., a fluid pipeline carrying fuel between a storage tank and a product dispenser) penetrating an aperture 102 in a sump wall 103. The penetration fitting 100 is configured to surround the pipe 101 and abut an inner wall surface 104 of the sump wall 103 to create a fluid-tight seal around the aperture 102 in the sump wall 103. The penetration fitting 100 includes first and second fitting halves 105, 106, respectively, that may be attached together around the pipe 101. The first and second fitting halves 105, 106 enable the fitting 100 to be installed around the existing pipe 101 without the need to cut and replace the pipe 101. The first and second fitting halves 105, 106 also include adjoining ends 115, 116 and 117, 118, respectively (see FIGS. 2A and 2B). When the fitting 100 is attached around the pipe 101, the ends 115, 116 of the first fitting half 105 are configured to abut the ends 117, 118 of the second fitting half 106. The first and second fitting halves 105, 106 are configured to be bonded together with a high viscosity (i.e., non-sagging) adhesive 107, described in detail below, applied to the adjoining ends 115, 116 and 117, 118. The first and second fitting halves 105, 106 are also configured to be bonded to the pipe 101 and to the inner wall surface 104 of the sump 103 with the adhesive 107. These bonds are configured to provide a seal between the pipe 101 and the first and second fitting halves 105, 106 and between the first and second fitting halves 105, 106, and the sump wall 103.

Referring now to the embodiment illustrated in FIGS. 2A and 2B, the first and second fitting halves 105, 106 each include inner surfaces 108, 109, respectively, configured to abut the inner wall surface 104 of the sump wall 103 and outer surfaces 110, 111, respectively, opposite the inner surfaces 108, 109. In one embodiment, the inner surfaces 108, 109 of the fitting halves 105, 106 are generally flat. The inner surfaces 108, 109 are formed on a first end 113 of the fitting 100 and the outer surfaces 110, 111 are formed on a second end 114 of the fitting 100.

Figure 1B:
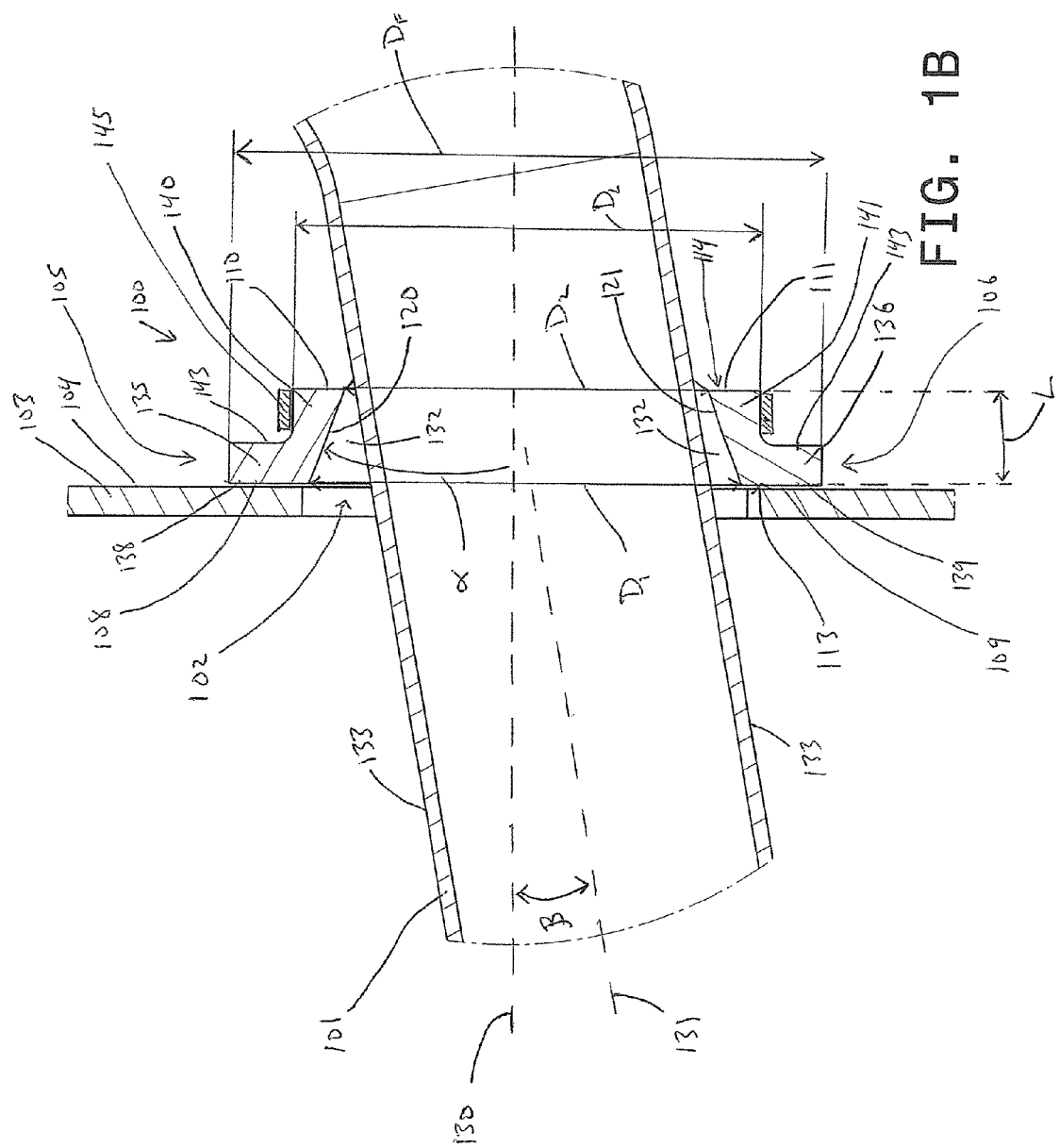

In the illustrated embodiments, the inner and outer surfaces 108, 109 and 110, 111, respectively, of the fitting halves 105, 106 are longitudinally spaced apart by a profile length L (i.e., the profile length L is the longitudinal envelope occupied by the fitting), as shown in FIG. 1B. In certain installations, a low profile penetration fitting 100 may be required to prevent interference between the fitting 100 and certain features of the pipe 101 or other components connected to the pipe 101 within the sump. For instance, in the embodiment illustrated in FIG. 1A in which the pipe includes a substantially 90° elbow bend 112 inside the sump, the low profile L of the fitting 100 is configured to prevent contact between the outer surfaces 110, 111 of the fitting halves 105, 106 and the pipe elbow 112. Otherwise, such contact may inhibit proper installation of the fitting 100 and may prematurely wear the pipe 101. In other embodiments, the low profile L of the fitting 100 may prevent contact between the outer surfaces 110, 111 of the fitting halves 105, 106 and another fitting on the pipe 101 (e.g., a termination fitting). In one embodiment, the profile length L may be between approximately 1 inch and approximately 2.5 inches, although the profile length L may be any other suitable dimension depending upon the configuration of the pipe and sump installation.

With continued reference to FIGS. 1B, 2A, and 2B, the first and second fitting halves 105, 106 each include an arcuate channel 120, 121, respectively, extending between the respective inner and outer surfaces 108, 109 and 110, 111. When the first and second fitting halves 105, 106 are attached together around the pipe 101, the arcuate channels 120, 121 cooperate to form an opening 122 through which the pipe 101 extends. Additionally, the arcuate channels 120, 121 taper at an angle α between relatively wider ends 123, 124 at the intersection with the inner surfaces 108, 109 and relatively narrower ends 125, 126 at the intersection with the outer surfaces 110, 111 of the fitting halves 105, 106. As shown in FIG. 1B, the taper angle α is defined between an imaginary longitudinal axis 130 of the fitting 100 and the arcuate channels 120, 121. In the illustrated embodiment, the arcuate channels 120, 121 taper at a 20° angle α relative to the imaginary longitudinal axis 130 of the opening 100. In alternate embodiments, the arcuate channels 120, 121 may taper at an angle α between approximately 5° and approximately 50°. Together, the tapered arcuate channels 120, 121 define a frusto-conical opening 122 having a relatively larger diameter $D_1$ at the first end 113 of the fitting 100 and a relatively smaller diameter $D_2$ at the second end 114 of the fitting 101 (i.e., the opening 122 is drafted between the first and second ends 113, 114, respectively, of the fitting 100). The frusto-conical opening 122 formed by the arcuate channels 120, 121 enables the fitting 101 to accommodate pipes 101 penetrating the sump wall 103 at an oblique angle β. As shown in FIG. 1B, the oblique angle β of the pipe 101 is defined between an imaginary longitudinal axis 131 of the pipe 101 and the imaginary longitudinal axis 130 of the fitting 100. For instance, in the illustrated embodiment of FIG. 1B in which the arcuate channels 120, 121 taper at a 20° angle α, the fitting 100 is configured to accommodate pipes 101 penetrating the sump wall 103 at an oblique angle β up to and including 20°.

With continued reference to the embodiment illustrated in FIG. 1B, when the fitting halves 105, 106 are attached together around the pipe 101, a wedge-shaped cavity 132 is defined between an outer wall 133 of the pipe 101 and the arcuate channels 120, 121 in the fitting halves 105, 106. Depending upon the orientation of the pipe 101 through the sump wall 103 (i.e., the angle β at which the pipe 101 penetrates the sump wall 103), it will be appreciated that the wedge-shaped cavity 132 may be larger on one portion of the fitting 100 than another portion. For instance, in the illustrated embodiment of FIG. 1B, an upper portion of the wedge-shaped cavity 132 is larger than a lower portion of the wedge-shaped cavity 132. As described in further detail below, the wedge-shaped cavity 132 is configured to be filled with non-sagging adhesive 107 to bond the fitting halves 105, 106 to the pipe 101, thereby creating a fluid-tight seal around the pipe 101. In one embodiment, the non-sagging adhesive 107 may extend rearward beyond the outer surfaces 110, 111 of the fitting halves 105, 106, respectively, to create a seal around the pipe 101.

Table 1 below shows the relationship between the nominal outer diameter of the pipe 101, the larger diameter $D_1$ of the opening 122 at the first end 113 of the fitting 100, and the smaller diameter $D_2$ of the opening 122 at the second end 114 of the fitting 100 for various embodiments of the present invention.

TABLE 1

| Nominal Outer Diameter of the Pipe (inches) | Larger Diameter $D_1$ (inches) | Smaller Diameter $D_2$ (inches) |
| --- | --- | --- |
| 2.0 | 3.5 | 2.6 |
| 4.0 | 5.4 | 4.5 |
| 4.0 | 5.8 | 4.9 |
| 0.5 | 2.0 | 1.0 |
| 0.8 | 2.3 | 1.3 |
| 1.0 | 2.5 | 1.5 |
| 3.0 | 4.6 | 3.8 |

It will be appreciated, however, that the present invention is not limited to the specific diameters recited above in Table 1, and any suitable combination of large and small diameters $D_1$, $D_2$, respectively, may be selected based upon the size of the pipe 101 and the oblique angle β at which the pipe 101 penetrates the sump wall 103.

With continued reference to the embodiment illustrated in FIGS. 2A and 2B, the drafted opening 122 formed by the tapered arcuate channels 120, 121 is circular in transverse cross-section to accommodate cylindrical pipes 101.

With reference again to the embodiment illustrated in FIGS. 2A and 2B, the fitting halves 105, 106 each include a semi-annular flange 135, 136, respectively, formed about a periphery of the relatively wider ends 123, 124 of the arcuate channels 120, 121. When the fitting halves 105, 106 are attached together around the pipe 101, the semi-annular flanges 135, 136 cooperate to define an annular flange on the first end 113 of the fitting 100 having an outer diameter $D_F$ (see FIG. 1B). As depicted in FIG. 1B, the annular flange on the first end 113 of the fitting 101 is configured to abut the inner wall surface 104 of the sump wall 103 and surround the aperture 102 in the sump wall 103. In the illustrated embodiment, the semi-annular flanges 135, 136 include inner surfaces 138, 139, respectively, which are co-planar with the inner surfaces 108, 109 of the fitting halves 105, 106.

With continued reference to FIGS. 2A and 2B, the fitting halves 105, 106 each include a semi-annular lip 140, 141 formed about a periphery of the relatively narrower ends 125, 126 of the arcuate channels 120, 121. When the fitting halves 105, 106 are secured together around the pipe 101, the semi-annular lips 140, 141 cooperate to define an annular lip on the second end 114 of the fitting 101 having a diameter $D_L$. In the illustrated embodiment, the diameter $D_F$ of the annular flange is larger than the diameter $D_L$ of the annular lip such than an annular shoulder 143 is formed between the annular flange and the annular lip.

In one embodiment, a band 145 (e.g., a standard hose clamp or zip tie) can be provided. The band 145 is configured to circumferentially surround the semi-annular lips 140, 141 of the fitting 100, as illustrated in FIG. 1B. In one embodiment, the annular band 145 is configured to abut the annular shoulder 143, which facilitates installation of the annular band 145 and prevents the annular band 145 from sliding longitudinally along the fitting 101. The annular band 145 is configured to bias the first and second fitting halves 105, 106 together until the adhesive 107 cures (i.e., the annular band 145 secures the first and second fitting halves 105, 106 together until the adhesive 107 sealing the fitting halves 105, 106 around the pipe 101 cures to form a permanent bond). In one embodiment, the annular band 145 may be removed after the adhesive 107 has cured. In another embodiment, the uncured adhesive may provide sufficient adhesion between the fitting halves 105, 106 such that fitting 100 may be provided without the annular band 145.

Referring now to the embodiment illustrated in FIGS. 3A-3C, an adapter plate 150 can be provided to accommodate sumps having a curved inner wall 151 (e.g., round or cylindrical-walled sumps). The adapter plate 150 is disposed between an inner wall surface 152 of the sump wall 151 and the inner surfaces 108, 109 of the fitting halves 105, 106. In the illustrated embodiment, the adapter plate 150 includes a first half 153 and a second half 154 attachable together around the pipe 101. Together, the first and second adapter plate halves 153, 154, respectively, define an annulus surrounding the pipe 101. The first and second adapter plate halves 153, 154 each include an inner surface 155, 156 configured to abut the inner wall surface 152 of the sump wall 151 and outer surface 157, 158 configured to abut the inner surfaces 108, 109 of the fitting halves 105, 106. In the illustrated embodiment, the inner surfaces 155, 156 of the adapter plate 150 are curved to generally match the curvature of the inner wall surface 152 of the sump wall 151 and the outer surfaces 157, 158 of the adapter plate 150 are generally flat to match the generally flat inner surfaces 108, 109 of the fitting 100. In an alternate embodiment, the fitting 100 may be provided without the adapter plate 150 and a layer of adhesive may be provided between the curved inner surface 152 sump wall 151 and the inner surfaces 108, 109 of the fitting 100 to ensure proper sealing between the fitting 100 and the curved sump wall 151 (i.e., a layer of adhesive may fill the gap between the curved inner wall surface 152 of the sump wall 151 and the flat inner surfaces 108, 109 of the fitting 100).

With continued reference to FIGS. 3A-3C, the adapter plate 150 also includes an opening 160 having a diameter $D_O$ extending between the inner surfaces 155, 156 and the outer surfaces 157, 158 of the adapter plates halves 153, 154. In the illustrated embodiment, the opening 160 is generally circular in transverse cross-section, although the opening 160 may have any other suitable cross-sectional shape and still fall within the scope and spirit of the present invention. For instance, in the embodiment in which an opening 222 in the fitting 200 is ellipsoidal (see FIGS. 5A and 5B, discussed below), the opening 160 in the adapter plate 150 may also be generally ellipsoidal. In the illustrated embodiment, the diameter $D_O$ of the opening 160 in the adapter plate 150 is larger than the larger diameter $D_1$ of the opening 122 in the first end 113 of the fitting 100 such that the adapter plate 150 is configured not to contact the pipe 101. Otherwise, the maximum oblique pipe angle $\beta$ that the fitting 100 could accommodate would be limited by the diameter $D_O$ of the opening 160 in the adapter plate 150. That is, if the diameter $D_O$ of the opening 160 in the adapter plate 150 was smaller than the larger diameter $D_1$ of the opening 122 in the fitting 100, the fitting 100 would not be configured to accommodate pipes 101 penetrating the sump wall 151 at an oblique angle $\beta$ up to and including the taper angle $\alpha$ of the arcuate channels 120, 121.

Table 2 below shows the relationship between the diameter $D_O$ of the opening 160 in the adapter plate 150 and the larger diameter $D_1$ of the opening 122 in the first end 113 of the fitting 100 for various embodiments of the present invention.

TABLE 2

| Diameter $D_O$ of the Opening in the Adapter Plate (inches) | Larger Diameter $D_1$ of the Opening in the Fitting (inches) |
| --- | --- |
| 3.0 | 2.5 |
| 3.0 | 2.3 |
| 5.3 | 4.6 |
| 6.0 | 5.5 |
| 5.3 | 3.5 |
| 6.0 | 5.8 |
| 3.0 | 2.0 |

It will be appreciated, however, that the present invention is not limited to the specific diameters recited in Table 2 above, and any suitable combination of diameters $D_O$, $D_1$ in the adapter plate 150 and the fitting 100, respectively, may be selected based upon the thickness of the adapter plate 150 and the oblique angle $\beta$ at which the pipe 101 penetrates the sump wall 151.

With reference now to the embodiment illustrated in FIGS. 4A-4E, some conventional sump walls are formed of a flexible material (e.g., polyethylene) and therefore tend to warp under external loading. The localized warping of a sump wall 162 may compromise the integrity and efficacy of the seal formed around the aperture 164 in the sump wall 162 by the fitting 100. In such a situation, a hub 161 can be provided to mechanically secure the fitting 100 to the sump wall 162 to create a liquid-tight seal around a pipe 163 penetrating an aperture 164 in the sump wall 162. The hub 161 is configured to maintain localized flattening of the sump wall 162 in the region of the sump wall 162 to which the fitting 100 is attached (i.e., the hub 161 is configured to locally flatten the sump wall 162 around the aperture 164 in the sump wall 162 by mechanically drawing the sump wall 162 flush against the hub 161). Additionally, adhesives configured to bond to polyethylene tend to swell and delaminate in a fuel environment. Accordingly, the hub 161 is configured to mechanically compress the adhesive and thereby prevent delamination of the adhesive from the sump wall 162. In one embodiment, the hub 161 is also configured to create a vapor barrier between the adhesive and any fuel vapor that may be present inside the sump.

Figure 4C:
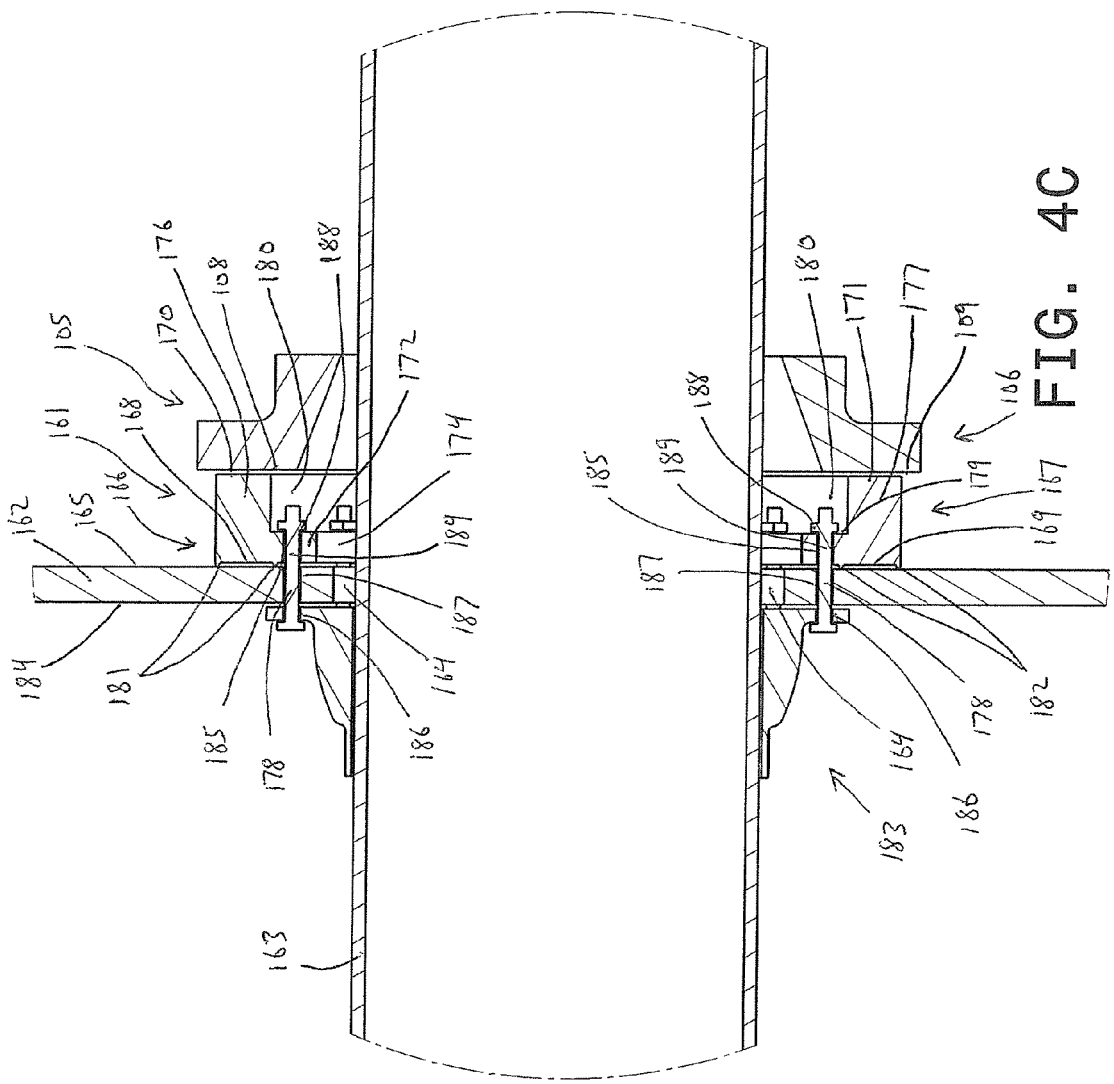
FIG. 4C is an enlarged partial cross-sectional view of the penetration fitting and hub of FIG. 4A coupled to the boot of FIG. 4B.

In the embodiment illustrated in FIGS. 4A and 4C, the hub 161 is disposed between an inner wall surface 165 of the sump wall 162 and the inner surfaces 108, 109 of the fitting halves 105, 106. Additionally, in certain sump installations, an existing boot 183 may have already been installed on an outer wall surface 184 of the sump wall 162 with a plurality of fasteners 178 extending through the sump wall 162, as shown in the embodiment illustrated in FIG. 4B. When an existing boot 183 is installed to an outer wall surface 184 of the sump wall 162, the hub 161 can be installed to the inner wall surface 165 of the sump wall 162 using the same fasteners 178 that secured the existing boot 183 to the sump wall 162 (i.e., the existing fasteners 178 can be repurposed to secure the hub 161 to the sump wall 162).

As illustrated in the embodiment of FIG. 4C, the boot 183 and the sump wall 162 both include a circular pattern of openings 186, 187, respectively. The circular pattern of openings 186 in the boot 183 is aligned with the circular pattern of openings 187 in the sump wall 162 to receive the fasteners 178 securing the boot 183 to the sump wall 162. Accordingly, to facilitate installation of the hub 161 with the existing fasteners 178, the hub 161 includes a plurality of circumferentially disposed apertures 185, described in more detail below, configured to align with the circular pattern of openings 186, 187 in the boot 183 and the sump wall 162, respectively.

Figure 4E:
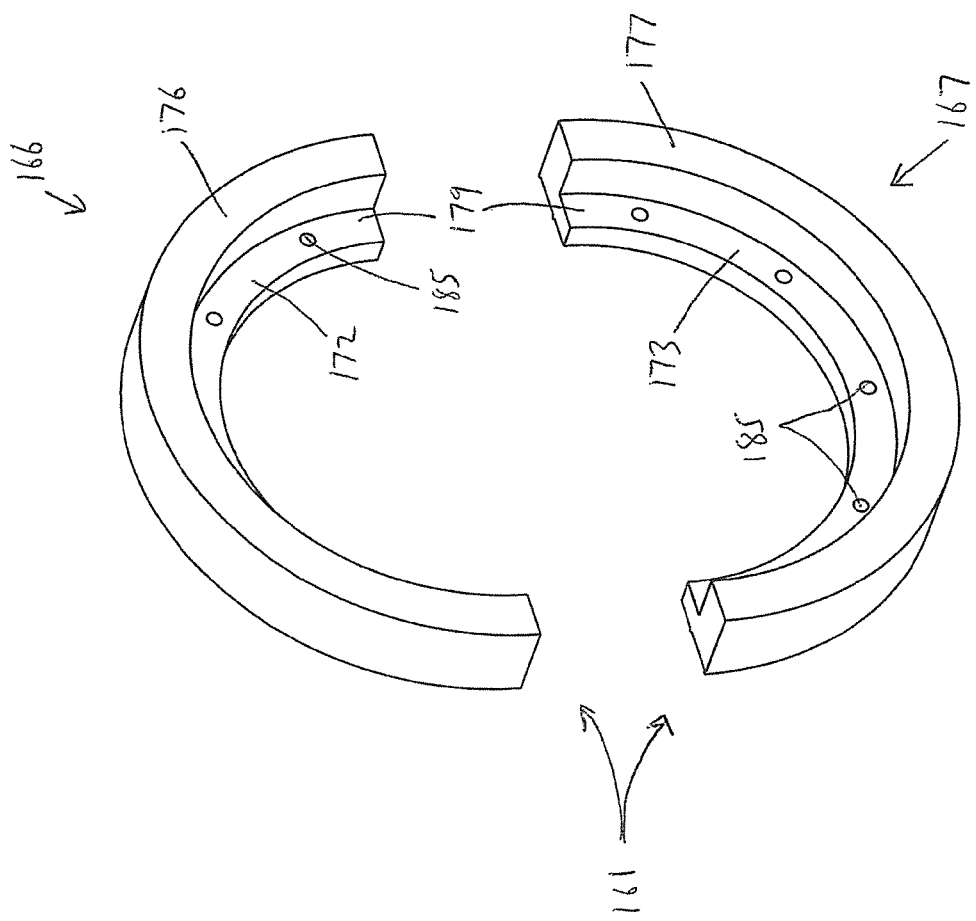
FIGS. 4D and 4E are exploded front and rear perspective views, respectively, of the hub of FIG. 4A.
Figure 4D:
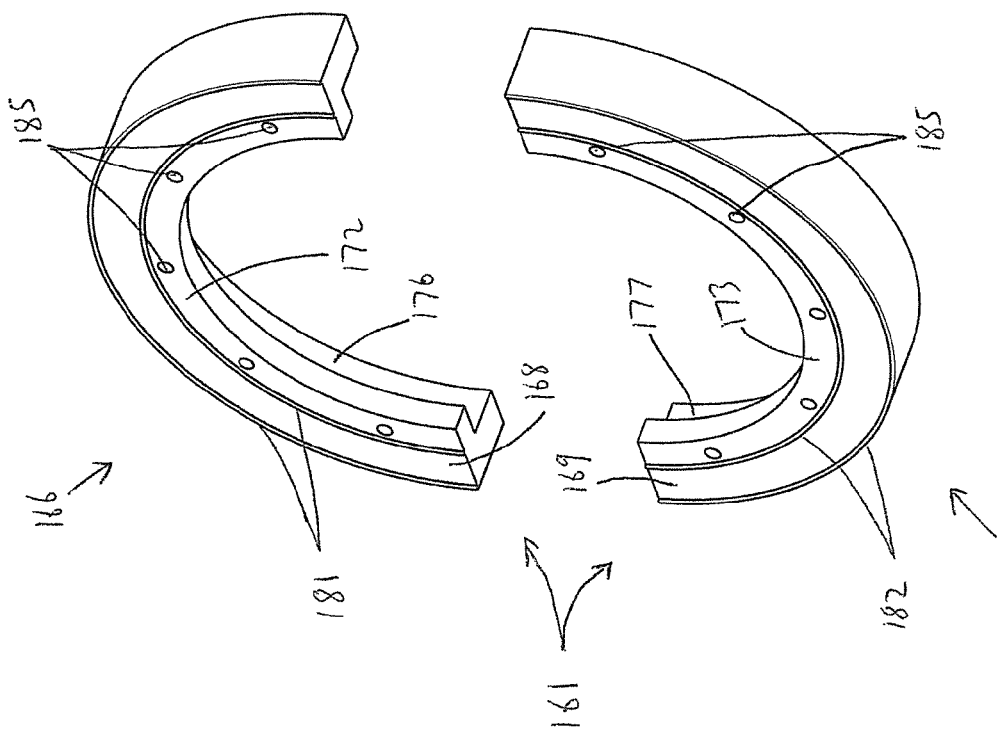

With reference now to FIGS. 4C-4E, the hub 161 includes first and second hub halves 166, 167 that may be attached together around the pipe 163. The first and second hub halves 166, 167 are configured to enable the hub 161 to be installed around existing pipes without excavating and cutting the pipe. The hub halves 166, 167 each include an inner surface 168, 169 configured to abut the inner wall surface 165 of the sump wall 162 and an outer surface 170, 171 configured to abut the inner surfaces 108, 109 of the fitting halves 105, 106, respectively. The hub halves 166, 167 include first and second semi-annular rims 172, 173 (best shown in FIGS. 4D and 4E). Together, the first and second semi-annular rims 172, 173 cooperate to define an opening 174 configured to receive the pipe 163. The first and second semi-annular rims 172, 173 also cooperate to define an annular rim completely surrounding the pipe 163. The first and second semi-annular rims 172, 173 also include the plurality of apertures 185 configured to receive the plurality of fasteners 178 securing the hub 161 to the sump wall 162, as described in further detail below.

With continued reference to the embodiment illustrated in FIGS. 4A and 4C-4E, the first and second hub halves 166, 167 also include first and second semi-annular standoffs 176, 177, respectively, extending circumferentially around outer peripheries of the semi-annular rims 172, 173 and projecting rearward. Together, the semi-annular standoffs 176, 177 are configured to space the fitting 100 apart from the semi-annular rims 172, 173 such that the fasteners 178 securing the hub 161 to the sump wall 162 do not contact the fitting 100. As shown in FIGS. 4C and 4E, the semi-annular rims 172, 173 are wider than the semi-annular standoffs 176, 177 such that an annular shoulder 179 is defined between the semi-annular rims 172, 173 and the semi-annular standoffs 176, 177. Moreover, a cavity 180 is defined between the shoulder 179 of the hub 161 and the inner surfaces 108, 109 of the fitting halves 105, 106. The cavity 180 is configured to house a portion of the fasteners 178 securing the hub 161 to the sump wall 162.

In the illustrated embodiment of FIGS. 4C and 4D, both of the hub halves 166, 167 also include two spaced apart arcuate ridges 181, 182 projecting outward from the inner surfaces 168, 169, the significance of which is explained below. In an alternate embodiment in which the sump wall 162 is formed from a generally rigid material, such as fiber-reinforced plastic (FRP), the hub 161 may be provided without the ridges 181, 182.

To install the fitting 100 to the pipe 101 and the sump wall 103, a thick layer of non-sagging adhesive 107 is applied to the arcuate channels 120, 121 in the fitting halves 105, 106. A layer of non-sagging adhesive 107 is also applied to the adjoining ends 115, 116 and 117, 118 of the fitting halves 105, 106. When the fitting halves 105, 106 are brought together around the pipe 101, the adhesive 107 applied to the adjoining ends 115, 116 and 117, 118 of the fitting halves 105, 106 is configured to attach the fitting halves 105, 106 together. Additionally, when the fitting halves 105, 106 are attached around the pipe 101, the thick layer of adhesive 107 applied to the arcuate channels 120, 121 substantially occupies the wedge-shaped cavity 132 between the outer wall of the pipe 101 and the first and second arcuate channels 120, 121. A layer of non-sagging adhesive 107 is also applied to the inner surfaces 108, 109 of the fitting halves 105, 106, respectively, before abutting the inner surfaces 108, 109 of the fitting halves 105, 106 against the inner wall surface 104 of the sump wall 103. Together, the adhesive 107 applied to the arcuate channels 120, 121, the adjoining ends 115, 116 and 117, 118, and the inner surfaces 108, 109 of the fitting halves 105, 106 creates a liquid-tight seal around the pipe 101.

When the sump wall 151 is curved, as shown in FIGS. 3A and 3B, the adapter plate 150 may be installed between the penetration fitting 100 and the sump wall 151 to ensure a proper seal around the pipe 101. To install the adapter plate 150, adhesive 107 is first applied to both the inner surfaces 155, 156 and the outer surfaces 157, 158 of the adapter plate halves 153, 154. The adapter plate halves 153, 154 are then attached together around the pipe 101, and the inner surfaces 155, 156 are abutted against the inner wall surface 104 of the sump wall 103. After the adapter plate 150 is installed, the fitting 100 may be installed substantially as described above. However, instead of abutting the inner surfaces 108, 109 of the fitting halves 105, 106 against the inner wall surface 104 of the sump wall 103, the inner surfaces 108, 109 of the fitting halves 105, 106 are abutted against the outer surfaces 157, 158 of the adapter plate halves 153, 154.

When the sump wall 162 is constructed of a flexible material (e.g., polyethylene), the hub 161 may be installed between the penetration fitting 100 and the sump wall 162 to mechanically draw the sump wall 162 flush against the hub 161 to create a seal around the pipe 163, as shown in FIGS. 4A and 4C. To install the hub 161, a boot on the inside of the sump (not shown) is first detached from the fasteners 178 by unscrewing nuts 188 on the ends of the fasteners 178. A layer of adhesive 107 may then be applied to the inner surfaces 168, 169 between the arcuate ridges 181, 182 of the hub halves 166, 167, respectively. The hub 161 is then installed by aligning the circumferentially disposed apertures 185 in the hub 161 with the fasteners 178 and then drawing the hub 161 against the inner wall surface 165 of the sump wall 162 such that the threaded shafts 189 of the fasteners 178 extend through the apertures 185 in the hub 161. The nuts 188 are then reinstalled on the ends of the fasteners 178. As the nuts 188 are tightened, the region of the sump wall 162 around the aperture 164 is drawn flush against the inner surfaces 168, 169 of the hub 161. In an alternate embodiment in which an existing boot 183 is not installed to the outer wall surface 184 of the sump wall 162 with a plurality of fasteners 178, the hub 161 may be installed to the inner wall surface 165 of the sump wall 162 with a plurality of blind fasteners.

When the hub 161 is attached to the sump wall 162, the narrow arcuate ridges 181, 182 are configured to dig into the inner wall surface 165 of the sump wall 162, as shown in FIG. 4C. The engagement between the narrow arcuate ridges 181, 182 and the inner wall surface 165 of the sump wall 162 is configured to create a fluid-tight seal between the inner surfaces 168, 169 of the hub 161 and the inner wall surface 165 of the sump wall 162. Additionally, when adhesive 107 is applied to the inner surfaces 168, 169 of the hub 161, the narrow arcuate ridges 181, 182 encapsulate the adhesive 107 between the ridges 181, 182 and isolate it from any fuel vapor that may be present inside the sump. Otherwise, exposing the adhesive 107 to the fuel vapor inside the sump may cause the adhesive to 107 to swell and delaminate from the inner wall surface 165 of the sump wall 162, thereby compromising the integrity and efficacy of the seal formed around the aperture 164 in the sump wall 162. After the hub 161 is installed to the sump wall 162, the fitting 100 may be installed substantially as described above. However, instead of abutting the inner surfaces 108, 109 of the fitting halves 105, 106 against the inner wall surface 104 of the sump wall 103, the inner surfaces 108, 109 of the fitting halves 105, 106 are abutted against the outer surfaces 170, 171 of the semi-annular standoffs 176, 177 of the hub 161. Additionally, a fluid-tight seal may be formed between the fitting 100 and the hub 161 by an annular bead of adhesive 107 extending around a joint between the inner surfaces 108, 109 of the fitting halves 105, 106 and the semi-annular standoffs 176, 177 of the hub 161.

In an alternate embodiment illustrated in FIGS. 5A-5D, a penetration fitting 200 includes first and second fitting halves 205, 206 having arcuate channels 220, 221, respectively. The first and second fitting halves 205, 206 include adjoining ends 215, 216 and 217, 218, respectively, and inner surfaces 208, 209, respectively, configured to abut an inner wall surface 204 of a sump wall 203. Substantially as described above, the arcuate channels 220, 221 taper at an angle θ relative to an imaginary longitudinal axis 230 of the fitting 200. Together, the arcuate channels 220, 221, define a drafted opening 222 which is generally ellipsoidal in transverse cross-section. As depicted in FIGS. 5A and 5B, the opening 222 having an ellipsoidal transverse cross-section may be configured to accommodate a single pipe 201 extending at an oblique angle β exceeding the taper angle θ of the arcuate channels 220, 221. As described above, the oblique angle β of the pipe 201 is defined between an imaginary longitudinal axis 231 of the pipe 201 and the imaginary longitudinal axis 230 of the fitting 200. For instance, as shown in FIGS. 5A and 5B, the arcuate channels 220, 221 of the fitting halves 205, 206 taper at a 20° angle θ, whereas the pipe 201 penetrates the sump wall 203 at an oblique angle β exceeding 20°, such as 30°.

To install the fitting 200 to the pipe 201 and the sump wall 203, a thick layer of non-sagging adhesive 207 is applied to the arcuate channels 220, 221 in the fitting halves 205, 206. A layer of non-sagging adhesive 207 is also applied to the adjoining ends 215, 216 and 217, 218 of the fitting halves 205, 206. When the fitting halves 205, 206 are brought together around the pipe 201, the adhesive 207 applied to the adjoining ends 215, 216 and 217, 218 of the fitting halves 205, 206 is configured to attach the fitting halves 205, 206 together. Additionally, when the fitting halves 205, 206 are attached around the pipe 201, the thick layer of adhesive 207 applied to the arcuate channels 220, 221 is configured to substantially occupy a wedge-shaped cavity 232 (see FIG. 5B) between the outer wall of the pipe 201 and the first and second arcuate channels 220, 221. A layer of non-sagging adhesive 207 is also applied to the inner surfaces 208, 209 of the fitting halves 205, 206, respectively, before abutting the inner surfaces 208, 209 of the fitting halves 205, 206 against the inner wall surface 204 of the sump wall 203. Together, the adhesive 207 applied to the arcuate channels 220, 221, the adjoining ends 215, 216 and 217, 218, and the inner surfaces 208, 209 of the fitting halves 205, 206 creates a liquid-tight seal around the pipe 201.

Figures 6A, 6B:
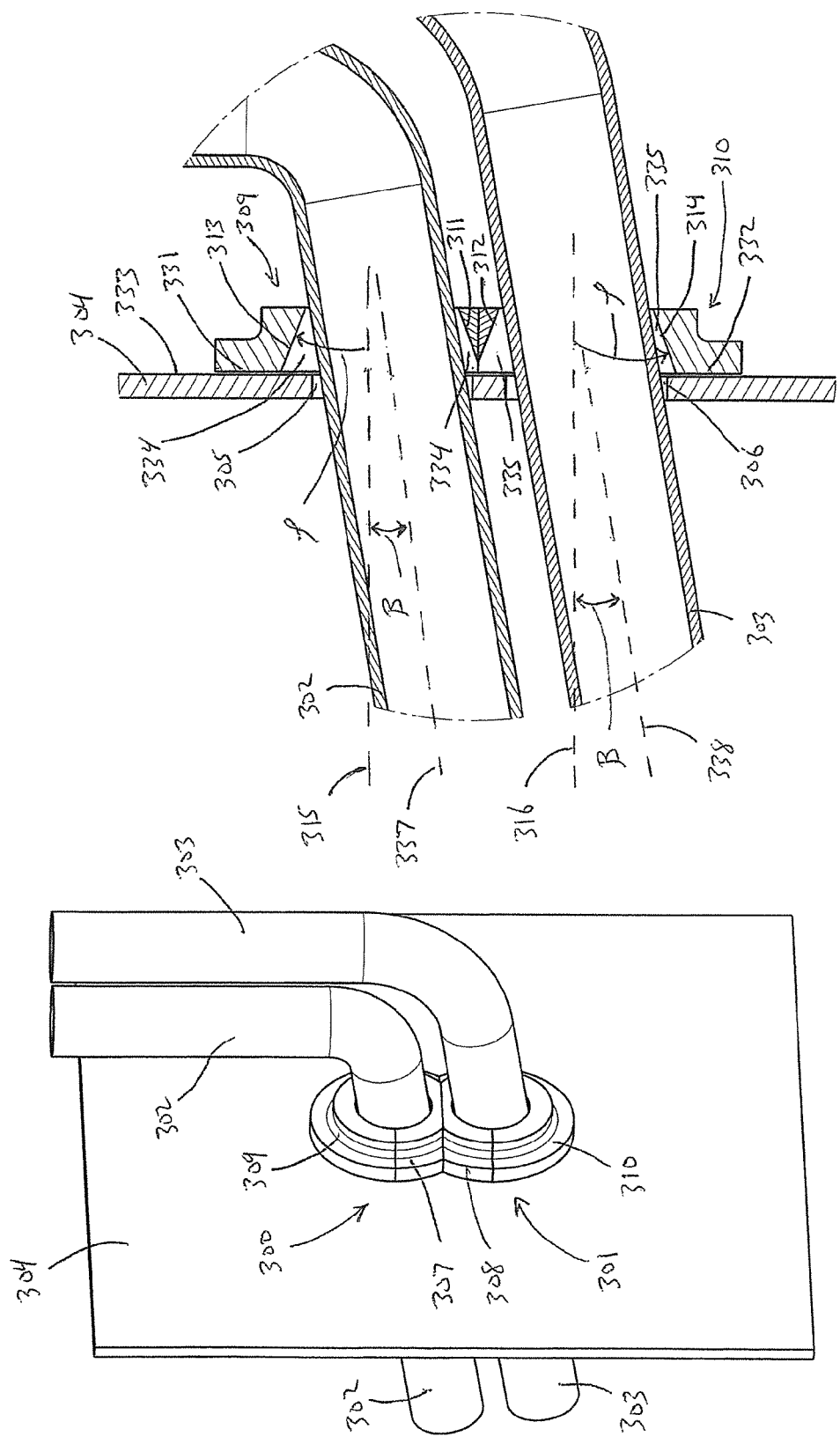
FIGS. 6A and 6B are a rear perspective view and an enlarged partial cross-sectional view, respectively, of another penetration fitting according to an embodiment of the present invention forming a seal around two closely spaced pipes penetrating a sump wall at oblique angles.

In an alternate embodiment illustrated in FIGS. 6A-6D, penetration fittings 300, 301 are configured to accommodate two closely spaced pipes 302, 303 penetrating a sump wall 304 at an oblique angle β (i.e., the penetration fittings 300, 301 are configured to create a liquid-tight seal around two closely spaced pipes 302, 303 penetrating through two apertures 305, 306, respectively, in the sump wall 304). The penetration fittings 300, 301 each include inner and outer fitting halves 307, 308 and 309, 310, respectively. Substantially as described above, the fitting halves 307, 308, 309, 310 have arcuate channels 311, 312, 313, 314, respectively, which taper at an angle ρ relative to imaginary longitudinal axes 315, 316 of the fittings 300, 301, respectively, as shown in FIG. 6B. As described above, the oblique angle β of the pipes 302, 303 is defined between imaginary longitudinal axes 337, 338 of the pipes 302, 303, respectively, and the imaginary longitudinal axes 315, 316 of the fittings 300, 301, respectively. Together, the arcuate channels 311, 313 and 312, 314 define drafted openings 317, 318 which are generally circular in transverse cross-section. As depicted in FIGS. 6A and 6B, the inner fitting halves 307, 308 are disposed between the two pipes 302, 303 and the outer fitting halves 309, 310 are disposed on opposite outer sides of the pipes 302, 303. Ends 319, 320 of the inner fitting halves 307, 308, respectively, are truncated to accommodate the spacing between the pipes 302, 303. When the fittings 300, 301 are installed around the pipes 302, 303, the truncated ends 319, 320 of the inner fitting halves 307, 308 abut each other, as shown in FIG. 6B. The fitting halves 307, 308, 309, 310 also include adjoining ends 321, 322, 323, 324, 325, 326, 327, 328, as illustrated in FIGS. 6C and 6D. When the fittings 300, 301 are installed around the pipes 302, 303, adjoining ends 321, 322 of fitting half 307 are configured to abut adjoining ends 325, 326 of fitting half 309, and adjoining ends 323, 324 of fitting half 308 are configured to abut adjoining ends 327, 328 of fitting half 310. The fitting halves 307, 308, 309, 310 also include inner surfaces 329, 330, 331, 332, respectively, configured to abut an inner wall surface 333 of the sump wall 304, as illustrated in FIG. 6B.

To install the fittings 300, 301 to the pipes 302, 303 and the sump wall 304, a thick layer of non-sagging adhesive 336 is applied to the arcuate channels 311, 312, 313, 314 in the fitting halves 307, 308, 309, 310, respectively. A layer of non-sagging adhesive 336 is also applied to the adjoining ends 321, 322, 323, 324, 325, 326, 327, 328 of the fitting halves 307, 308, 309, 310. When the fitting halves 307, 308, 309, 310 are brought together around the pipes 302, 303, the adhesive 336 applied to the adjoining ends 321, 322, 323, 324, 325, 326, 327, 328 of the fitting halves 307, 308, 309, 310 is configured to attach the fitting halves 307, 308 together and fitting halves 309, 310 together. Additionally, when the fitting halves 307, 308, 309, 310 are attached around the pipes 302, 303, the thick layer of adhesive 336 applied to the arcuate channels 311, 312, 313, 314 is configured to substantially occupy wedge-shaped cavity 334 between outer walls of pipe 302 and arcuate channels 311, 313 and wedge-shaped cavity 335 between the outer walls of pipe 303 and arcuate channels 312, 314 (see FIG. 6B). A layer of non-sagging adhesive 336 is also applied to the inner surfaces 329, 330, 331, 332 of the fitting halves 307, 308, 309, 310, respectively, before abutting the inner surfaces 329, 330, 331, 332 of the fitting halves 307, 308, 309, 310 against the inner wall surface 333 of the sump wall 304. A layer of non-sagging adhesive 336 is also applied to the truncated ends 319, 320 of the inner fitting halves 307, 308 before abutting the truncated ends 319, 320 against each other. Together, the adhesive 336 applied to the arcuate channels 311, 312, 313, 314, the adjoining ends 321, 322, 323, 324, 325, 326, 327, 328, the inner surfaces 329, 330, 331, 332, and the truncated ends 319, 320 of the fittings 300, 301 creates a liquid-tight seal around the pipes 302, 303.

The penetration fitting 100, 200, 300, 301 of the present invention may be formed from any suitably rigid material having a relatively high chemical resistivity to hydrocarbons, such as a fiber reinforced plastic (FPR) composite material. In one embodiment, the fitting 100, 200, 300, 301 is formed from a FRP composite material having approximately 25% by volume fiberglass and approximately 75% by volume resin. The fitting 100, 200, 300, 301 may be manufactured by any suitable means, such as machining and/or molding. In one embodiment, the fitting 100 is first cast as a single part and then cut into the first and second fitting halves 105, 106 by any suitable process. When the fitting 100 is cut into the first and second fitting halves 105, 106, fibers from the FRP composite material are exposed. The exposed fibers facilitate bonding between the fitting halves 105, 106 with the adhesive. The fitting halves 105, 106 may then be secured together, such as by clamping, and then the drafted opening 122 may be formed, such as by machining the fitting halves 105, 106. Additionally, the inner surfaces 108, 109 of the first and second fitting halves 105, 106 may be machined flat while the fitting halves 105, 106 are secured together. In one embodiment, the adapter plate 150 and the hub 161 are formed from the same material as the penetration fitting 100, 200, 300, 301.

The embodiment of the fitting 200 depicted in FIGS. 5A-5D, in which the opening 222 has an ellipsoidal transverse cross-section, may be formed by first casting the fitting 200 as a single part and then machining a circular opening 122, as described above with reference to fitting 100 and shown in FIGS. 2A and 2B. The fitting 200 may then be cut into first and second fitting halves 105, 106 by any suitable process. Portions of the adjoining ends 115, 116 and 117, 118 of the fitting halves 105, 106 (see FIGS. 2A and 2B) may then be removed (e.g., cut) to form fitting halves 205, 206 (see FIGS. 5C and 5D) having an opening 222 with a generally ellipsoidal transverse cross-section. That is, by removing portions of the adjoining ends 115, 116 and 117, 118, the opening 222 is generally ellipsoidal when the fitting halves 205, 206 are brought together. It will be appreciated that the obliqueness of the ellipsoidal opening 222 in the fitting 200 is determined by the extent to which the adjoining ends 115, 116 and 117, 118 are cut. Removing a greater portion of the adjoining ends 115, 116 and 117, 118 will create a fitting 200 having a relatively more oblique ellipsoidal opening 222, whereas removing a lesser portion of the adjoining ends 115, 116 and 117, 118 will create a fitting 200 having a relatively less oblique ellipsoidal opening 222. Moreover, it is understood that removing portions of the adjoining ends 115, 116 and 117, 118 does not create a true ellipse. Rather, removing portions of the adjoining ends 115, 116 and 117, 118 creates a generally ellipsoidal opening 222 formed by two arcs of a circle.

The embodiment of the penetration fittings 300, 301 sealing two closely spaced pipes 302, 303, depicted in FIGS. 6A-6D, may be formed by first forming two fittings 100, as described above and shown in FIGS. 2A and 2B, and then removing (e.g., cutting) portions of one of the fitting halves 105, 106 of each fitting 100 to produce the inner fitting halves 307, 308 having truncated ends 319, 320 (see FIGS. 6C and 6D). It will be appreciated that the extent to which the ends of the fitting halves 105, 106 must be cut is determined by the spacing between the pipes 302, 303. The closer the pipes 302, 303 are spaced together, the greater the portion of the ends of the fitting halves 105, 106 which must be removed.

The adhesive 107, 207, 336 can be made of any suitably high viscosity resin composite (i.e., a non-sagging adhesive) configured to bond to fiberglass. In one embodiment, the adhesive 107, 207, 336 is a composite of an epoxy-based resin and fumed silica filler. In other embodiments, the adhesive 107, 207, 336 may be a composite of a vinylester- or polyester-based resin and fumed silica filler. In one embodiment, the viscosity of the adhesive 107, 207, 336 is between approximately 2,000 centipoise (cps) and 10,000,000 cps. Using a non-sagging adhesive 107, 207, 336 having a viscosity between approximately 2,000 cps and 10,000,000 cps helps to prevent the adhesive 107, 207, 336 from running during installation. Otherwise, using an adhesive 107, 207, 336 having a relatively low viscosity may prevent the adhesive 107, 207, 336 from completely filling the wedge-shaped cavity between the pipe and the arcuate channels of the fitting, thereby limiting the efficacy of the seal formed around the pipe.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "distal, "proximal" and similar terms have been used herein to describe a spatial relationship of one element to another, it is understood that these terms are intended to encompass different orientations of the various elements and components of the device in addition to the orientation depicted in the figures. Moreover, the figures contained in this application are not necessarily drawn to scale. Although the penetration fitting of the present invention is shown and described in use with a sump, the penetration fitting is not limited to such applications, and the penetration fitting of the present invention may be used in any industry to provide a fluid-tight seal around longitudinal members (e.g., tubes, pipes, conduits, etc.) penetrating through a wall segment. Additionally, although the present invention has been described with reference to fluid-carrying pipes, the penetration fitting described herein may also be used for non-fluid-carrying pipes, such as electrical conduits. Furthermore, although the fitting of the present invention has been described with reference to first and second halves, other variations are possible, such as fittings having more than two parts or fittings having parts of different sizes.

What is claimed is:

1. A penetration fitting configured to form a seal between at least one pipe segment and a sump wall at an aperture in the sump wall through which the at least one pipe segment passes, the penetration fitting comprising:
   a first fitting half having an inner surface and an outer surface opposite the inner surface, the first fitting half defining an arcuate channel; and
   a second fitting half having an inner surface and an outer surface opposite the inner surface, the second fitting half defining an arcuate channel, wherein the first and second fitting halves are adapted to abut one another with the inner surfaces of the first and second fitting halves together defining an inner end, the outer surfaces of the first and second fitting halves defining an outer end, and the arcuate channels of the first and second fitting halves cooperating to define a tapered opening tapering from the inner end to the outer end configured to accept the at least one pipe segment, the opening having a larger diameter at the inner end and a smaller diameter at the outer end with the inner end adapted to be sealed to the sump wall around the aperture.

2. The penetration fitting of claim 1, wherein the first fitting portion includes a semi-annular first flange formed about a periphery of the wider end of the first arcuate channel, and the second fitting portion includes a semi-annular second flange portion formed about a periphery of the wider end of the second arcuate channel, the first and second semi-annular flanges cooperating to define an annular flange on the inner end of the fitting configured to surround the aperture in the sump wall.

3. The penetration fitting of claim 2, wherein the first fitting portion includes a semi-annular first lip portion formed about a periphery of the narrower end of the first arcuate channel, and the second fitting portion includes a semi-annular second lip portion formed about a periphery of the narrower end of the second arcuate channel, the first and second semi-annular lip portions cooperating to define an annular lip on the outer end of the fitting.

4. The penetration fitting of claim 3, wherein the diameter of the annular flange is larger than the diameter of the annular lip.

5. The penetration fitting of claim 3, further comprising:
an annular shoulder defined between the annular flange and the annular lip; and
an annular band configured to surround the annular lip to bias the first and second fitting halves together at the shoulder.

6. The penetration fitting of claim 1, wherein the first and second fitting halves each extend approximately 180 degrees.

7. The penetration fitting of claim 1, wherein the opening is generally frusto-conical.

8. The penetration fitting of claim 1, wherein the first and second fitting halves comprise fiberglass reinforced plastic (FRP).

9. The penetration fitting of claim 1, wherein the fitting halves are generally rigid.

10. The penetration fitting of claim 1, wherein the opening is substantially circular in transverse cross-section.

11. The penetration fitting of claim 1, wherein the opening is generally ellipsoidal in transverse cross-section.

12. The penetration fitting of claim 1, wherein the arcuate channels taper at an angle between approximately 5 degrees and approximately 50 degrees.

13. The penetration fitting of claim 1, wherein the inner and outer surfaces of the fitting halves are spaced apart by a distance between approximately 1 inch and approximately 2.5 inches.

14. The penetration fitting of claim 1, further comprising an adapter plate configured to accommodate a sump wall with a curved inner wall surface, the adapter plate comprising:
an annulus having opposing inner and outer surfaces; and
an opening extending between the inner and outer surfaces, wherein the inner surface is curved and the outer surface is substantially flat, and
wherein the inner surface is configured to abut the curved inner wall surface of the sump wall, and the outer surface is configured to abut the inner end of the fitting halves, thereby permitting the inner end of the first and second fitting halves to be sealed to the sump wall via the adapter plate.

15. The penetration fitting of claim 14, wherein the adapter plate comprises a first adapter plate half and a second adapter plate half, the first and second adapter plate halves being attachable together around the at least one pipe.

16. The penetration fitting of claim 14, further comprising an adhesive layer disposed between the outer surface of the adapter plate and the inner end of the fitting halves.

17. The fitting of claim 1, further comprising a hub configured to mechanically secure the penetration fitting to the sump wall and draw the sump wall flush against the hub, the hub comprising:
a first semi-annular rim;
a second semi-annular rim attachable to the first semi-annular rim, the first and second semi-annular rims cooperating to define an opening; and
a plurality of apertures disposed circumferentially around the rims, the plurality of apertures configured to receive a plurality of fasteners securing the hub to the sump wall, wherein the hub includes opposing inner and outer surfaces, the inner surface configured to abut an inner wall surface of the sump wall, and the outer surface configured to abut the inner end of the fitting halves, thereby permitting the inner end of the first and second fitting halves to be sealed to the sump wall via the hub.

18. The penetration fitting of claim 17, wherein the first semi-annular rim further comprises a first semi-annular standoff extending around a periphery of the first semi-annular rim, and the second semi-annular rim further comprises a second semi-annular standoff extending around a periphery of the second semi-annular rim.

19. The penetration fitting of claim 18, further comprising an adhesive bead extending along a joint between the semi-annular standoffs and the inner end of the fitting halves.

20. The penetration fitting of claim 17, wherein the first and second semi-annular rims each include at least one narrow ridge projecting from the inner surface and adapted to dig into the inner wall surface of the sump wall.

21. A penetration fitting configured to form a seal between at least one pipe segment and a sump wall at an aperture in the sump wall through which the at least one pipe segment passes, the penetration fitting comprising:
a first fitting half having an inner surface and an outer surface opposite the inner surface, the first fitting half defining an arcuate channel;
a second fitting half having an inner surface and an outer surface opposite the inner surface, the second fitting half defining an arcuate channel, wherein the first and second fitting halves are adapted to abut one another with the inner surfaces of the first and second fitting halves together defining an inner end, the outer surfaces of the first and second fitting halves defining an outer end, and the arcuate channels of the first and second fitting halves cooperating to define a tapered opening configured to accept the at least one pipe segment, the opening having a larger diameter at the inner end and a smaller diameter at the outer end with the inner end adapted to be sealed to the sump wall around the aperture; and
adhesive between the at least one pipe segment and the arcuate channels of the first and second fitting halves.

22. The penetration fitting of claim 21, wherein the adhesive comprises fiberglass.

23. The penetration fitting of claim 21, wherein the adhesive comprises a material having a viscosity between approximately 2,000 centipoise (cps) and 10,000,000 cps.

24. A penetration fitting configured to form a seal between at least one pipe segment and a sump wall at an aperture in the sump wall through which the at least one pipe segment passes, the penetration fitting comprising:
- a first fitting half having an inner surface and an outer surface opposite the inner surface, the first fitting half defining an arcuate channel;
- a second fitting half having an inner surface and an outer surface opposite the inner surface, the second fitting half defining an arcuate channel, wherein the first and second fitting halves are adapted to abut one another with the inner surfaces of the first and second fitting halves together defining an inner end, the outer surfaces of the first and second fitting halves defining an outer end, and the arcuate channels of the first and second fitting halves cooperating to define a tapered opening configured to accept the at least one pipe segment, the opening having a larger diameter at the inner end and a smaller diameter at the outer end with the inner end adapted to be sealed to the sump wall around the aperture; and an adhesive layer disposed between an inner wall surface of the sump wall and the inner end of the fitting halves.

25. A penetration fitting assembly configured to form a seal between at least one pipe segment and a sump wall with a curved inner wall surface at an aperture in the sump wall through which the at least one pipe segment passes, the penetration fitting assembly comprising:

a penetration fitting comprising:
- a first fitting half having an inner surface and an outer surface opposite the inner surface, the first fitting half defining an arcuate channel; and
- a second fitting half having an inner surface and an outer surface opposite the inner surface, the second fitting half defining an arcuate channel, wherein the first and second fitting halves are adapted to abut one another with the inner surfaces of the first and second fitting halves together defining an inner end, the outer surfaces of the first and second fitting halves defining an outer end, and the arcuate channels of the first and second fitting halves cooperating to define a tapered opening configured to accept the at least one pipe segment, the opening having a larger diameter at the inner end and a smaller diameter at the outer end; and an adapter plate comprising:
- an annulus having opposing inner and outer surfaces; and
- an opening extending between the inner and outer surfaces, wherein the inner surface is curved and the outer surface is substantially flat, and wherein the inner surface is configured to abut the curved inner wall surface of the sump wall, and the outer surface is configured to abut the inner end of the fitting halves, thereby permitting the inner end of the first and second fitting halves to be sealed to the sump wall via the adapter plate.

26. A penetration fitting assembly configured to form a seal between at least one pipe segment and a sump wall at an aperture in the sump wall through which the at least one pipe segment passes, the penetration fitting assembly comprising:

a penetration fitting comprising:
- a first fitting half having an inner surface and an outer surface opposite the inner surface, the first fitting half defining an arcuate channel; and
- a second fitting half having an inner surface and an outer surface opposite the inner surface, the second fitting half defining an arcuate channel, wherein the first and second fitting halves are adapted to abut one another with the inner surfaces of the first and second fitting halves together defining an inner end, the outer surfaces of the first and second fitting halves defining an outer end, and the arcuate channels of the first and second fitting halves cooperating to define a tapered opening configured to accept the at least one pipe segment, the opening having a larger diameter at the inner end and a smaller diameter at the outer end; and a hub configured to mechanically secure the penetration fitting to the sump wall and draw the sump wall flush against the hub, the hub comprising:
- a first semi-annular rim;
- a second semi-annular rim attachable to the first semi-annular rim, the first and second semi-annular rims cooperating to define an opening; and
- a plurality of apertures disposed circumferentially around the rims, the plurality of apertures configured to receive a plurality of fasteners securing the hub to the sump wall, wherein the hub includes opposing inner and outer surfaces, the inner surface configured to abut an inner wall surface of the sump wall, and the outer surface configured to abut the inner end of the fitting halves, thereby permitting the inner end of the first and second fitting halves to be sealed to the sump wall via the hub.

* * * * *